Nov. 11, 1924.  
L. J. LEON  
BIRD CAGE  
Filed Oct. 14, 1922  
1,514,624
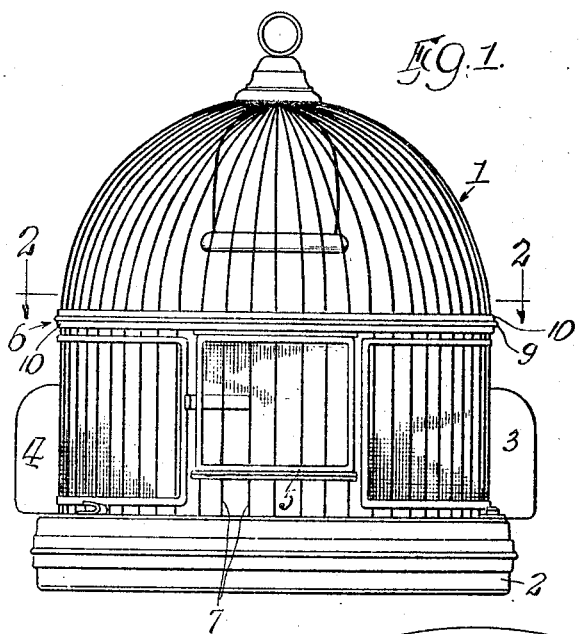
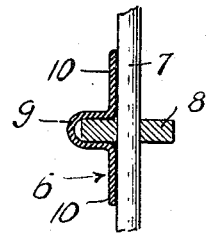
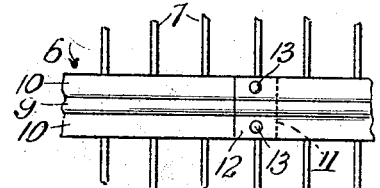
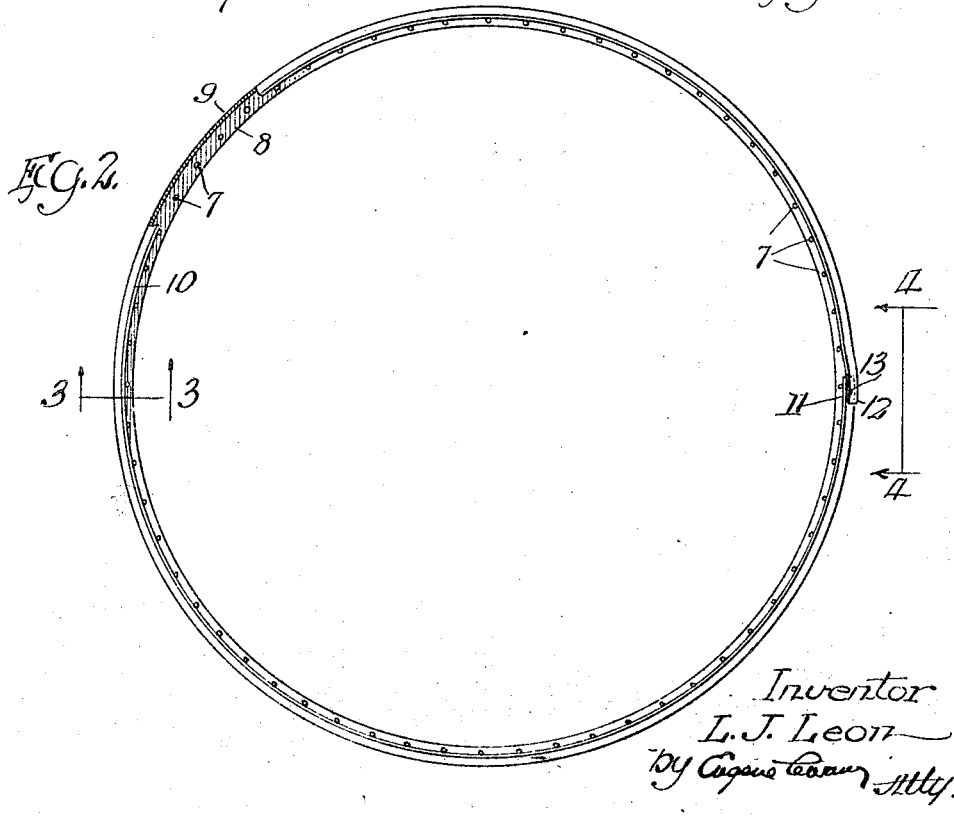
Inventor  
L. J. Leon Patented Nov. 11, 1924.

1,514,624

UNITED STATES PATENT OFFICE.

LEWICKI J. LEON, OF CHICAGO, ILLINOIS, ASSIGNOR TO L. J. LEON MFG. CO., OF CHICAGO, ILLINOIS, A CORPORATION OF ILLINOIS.

BIRD CAGE.

Application filed October 14, 1922. Serial No. 594,431.

*To all whom it may concern:*

Be it known that I, LEWICKI J. LEON, a citizen of the United States, residing at Chicago, in the county of Cook and State of Illinois, have invented new and useful Improvements in Bird Cages, of which the following is a specification.

This invention relates to means for attaching or securing highly polished or ornamental bands about bodies of bird cages.

The object of my invention is to secure the band to the cage body in a manner that no solder is required and thus permit applying the band to the cage body after the band has been completely finished, either highly polished or ornamented, as may be the case, without damaging or marring the finish of the band.

The invention consists further in the matters hereinafter described and more particularly set forth in the appended claims.

In the accompanying drawings—

Fig. 1 is a side elevational view of a bird cage having a highly polished band secured to the cage body in accordance with my invention;

Fig. 2 is an enlarged horizontal sectional view taken on line 2—2 of Fig. 1;

Fig. 3 is an enlarged vertical sectional view taken through the band on line 3—3 of Fig. 2; and Fig. 4 is a fragmentary elevational view at the meeting ends of the bands and taken on line 4—4 of Fig. 2.

As illustrated in Fig. 1, the cage comprises a body 1 and a removable base or pan 2, both circular in form, and with the top of the cage body 1 domed shape, as shown.

Surrounding the cage body 1 above the feed and water cups 3, 4, and the hinged door 5, is a metal band 6 which may be ornamented or colored, or as shown in the drawings, be left plain and be given a high polish or finish on its exposed or outside surface to present a high luster and thus enhance the ornate effect of the cage as a whole especially when the wires 7, 7 of the cage body and certain outside surfaces of the base or pan 2 are given a contrasting color such as dark mahogany.

My invention has reference to the manner of fastening this highly polished band 6 to the cage body. As shown in the drawings, the several wires 7, 7 pass through a ring 8 positioned behind the band 6. The ring 8 is arranged horizontal and the wires 7, 7 have a tight fit in it so that the ring maintains its proper position on the wires, and moreover aids in keeping them spaced apart the proper distance. As shown in Fig. 3, the ring 8 extends on opposite sides of the wires 7, 7 thus it has a portion projecting outside the cage body.

The band 6 is provided intermediate its top and bottom edges with an outwardly bulged portion 9 providing a channel to receive the outer part of the ring 8. The latter, therefore, holds or supports the band 6 on the cage body 1. The band 6 on opposite sides of the channel part 9 has vertical extending flanges 10, 10 which bear flatwise against the portions of the wires 7, 7 above the ring 8, as shown in Fig. 3. The split ends 11, 12 of the band 6 overlap at one side of the cage body as indicated in Figs. 2 and 4, and are secured together in any suitable manner as by the use of rivets 13, 13. These hold the band 6 about the cage body 1 while the ring 8 holds the band in its proper vertical position thereon.

By the construction described, the band 6 is secured in place without the use of solder between the band and the wires 7, or ring 8 as heretofore. This allows the band 6 to be polished or ornamented, as the case may be, before placing it about the cage body because no solder is used in securing the band in place and thus damaging or impairing the highly finished surface of the band is avoided. No solder being used, the band may naturally be finished as a separate part before attachment to the cage body and thus increase production and decrease cost of manufacture of the cages because the process is not slowed up by soldering the band to the cage body and then finishing it as heretofore. Moreover, buffing of the exposed surface of the band 6 to give it a high finish is done before the band is applied to the cage body and thus none of the wires and other part are present to interfere with the buffing operation or catch in the buff to injure the latter or the workman during the job.

While I have shown and described herein in detail a means for attaching a highly polished or ornamented band to a bird cage without the use of solder, it is of course to be understood that the details of construction may be variously changed and modified without departing from the spirit and scope of my invention.

I claim as my invention:

1. A bird cage, comprising a cage body and a base, said cage body being made of wires, a band surrounding said cage body for ornate purposes, and a ring carried by the wires of the cage body at said band, said ring and band having interfitting parts independent of said wires for supporting the band on the cage body without the use of solder.

2. A bird cage, comprising a cage body and a base, a band surrounding the cage body above its lower end for ornate purposes, and a ring carried by the cage body at said band, said band having an outwardly bulged portion forming a channel to receive said ring for holding said band on the cage body.

3. A bird cage comprising a cage body, said cage body being formed of a plurality of parallel wires extending from top to bottom thereof, a band surrounding the cage body above its lower end for ornate purposes, and a ring surrounding the cage body behind said band and being secured to said wires, said ring projecting outward from said wires, said band having an outwardly bulged portion between its top and bottom edges to form a channel for said ring and support the band thereby, said band having vertical flanges in the same plane on opposite sides of the ring and bearing flatwise against adjacent portions of said wires.

4. A bird cage, comprising a cage body and a pan, both circular in shape, said cage body being formed of a plurality of parallel wires extending from top to bottom thereof, an annular band surrounding said cage body above its lower end for ornate purposes, and a ring surrounding said cage body behind said band and having the wires extending therethrough with a tight fit, said ring projecting outward from said wires, said band having an outwardly bulged portion between its top and bottom edges to form a channel for said ring and support the band thereby, said band having vertical flanges in the same plane on opposite sides of said ring and bearing flatwise against adjacent portions of said wires, said band having split ends overlapped and secured together at one side of said cage body.

5. A bird cage, comprising a cage body and a pan, a band and a ring surrounding said cage body above its lower end, said ring being carried by said cage body, one of said last two mentioned parts being provided with a channel to receive a part of the other mentioned part to support the band by the ring.

In testimony that I claim the foregoing as my invention, I affix my signature this 12th day of October, A. D. 1922.

LEWICKI J. LEON.